United States Patent Office 3,362,924
Patented Jan. 9, 1968

3,362,924
CURABLE COMPOSITIONS COMPRISING POLYETHYLENE, PEROXIDE AND PARTICULATE CALCIUM CARBONATE COATED WITH CALCIUM STEARATE
Warren O. Eastman, 3602 Fallen Timber Drive, Louisville, Ky. 40222
No Drawing. Filed Aug. 4, 1966, Ser. No. 570,170
8 Claims. (Cl. 260—23)

This invention is related to compositions comprising polyethylene, blends of polyethylene and other polymers; and copolymers of ethylene and other olefins; a peroxide cross-linking agent; and treated calcium carbonate filler: it is also related to the cured products thereof and wire and cable insulated with such compositions.

This application is a continuation-in-part of application Ser. No. 47,937 filed Aug. 8, 1960, now abandoned.

Precopio and Gilbert Patent No. 2,888,424, which is assigned to the same assignee as the present application, disclosed polyethylene cross-linked with a tertiary peroxide into which silica, carbon black, alumina, and calcium silicate were incorporated as filler materials. In the Precopio et al. patent, Example 4 in column 7 sets forth the inferior properties of cross-linked polyethylene when the filler material is calcium carbonate.

One of the objects of the present invention is to provide a chemically cross-linked polyethylene having high tensile strength and elongation when calcium carbonate is used as a filler material.

Briefly stated, in accordance with one of its aspects, the present invention is directed to a filler-containing chemically cross-linked polyethylene in which the filler consists of calcium carbonate in which the particle surface consists of an integrally bonded reaction product of calcium carbonate and a carboxylic acid in which the acid molecule contains sixteen or more carbon atoms.

The calcium carbonate fillers useful in the present invention have a particle size giving a surface area of at least one square meter per gram and preferably in excess of forty square meters per gram. While precipitated calcium carbonate may be used, the less expensive particles achieved by grinding are entirely satisfactory. Such finely ground calcium carbonate is readily available on the open market under various trade designations. While crystalline ground whitings such as those available under the designation Atomite or precipitated whitings such as those sold under the designation Witcarb are satisfactory, the calcium carbonate may be amorphous in nature. An entirely satisfactory filler is composed of Champagne Whiting formed by grinding chalk. In a preferred form, this material has a particle size range of 0.1–3 microns and an average particle size of about 1.5 microns. Such a filler material has a specific gravity of about 2.6 and it is desirable that it be slightly alkaline and free of moisture.

A calcium carbonate powder, as described above, should be given a surface treatment before it is usable in accordance with this invention. Such a treatment consists of reacting a carboxylic acid in which the molecule contains sixteen or more carbon atoms with the calcium carbonate. Stearic acid is preferred for this purpose but palmitic acid and oleic are also satisfactory as well as the more expensive lignoceric (tetracosanoic) acid and cerotic (hexacosanoic) acid. In addition to oleic acid, other unsaturated acids which are satisfactory are linoleic acid and linolenic acid.

The reaction between the calcium carbonate powder and acid is carried out by contacting the powder with 0.5 to 3 percent its weight of acid at a temperature in excess of 150° C. This results in complete surface treatment of the powder provided the quantity of acid used is correlated with the particle size of the powder. In a powder with an average particle size of 1.5 microns, the addition of one percent stearic acid will result in complete surface treatment of the filler to form an integrally bonded calcium stearate layer and there will be a small quantity of unreacted acid remaining. It is desirable that the excess acid be kept to a minimum since a slight alkalinity in the final product is preferred.

Surface-treated filler materials, as described above, are sold under the designation OMYA–BSH and therefore will not be described in great detail here.

Among the peroxides which may be used to cure polyethylene containing the treated calcium carbonate of this invention are those in which each of the peroxide oxygens is linked directly to a carbon atom, a broad group which includes benzoyl-peroxide, and of these the preferred peroxides are those having the following formulae:

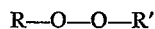

where R and R' (which may or may not be similar) are radicals from the group consisting of

and

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$, and $R_6$. $R_1$, $R_2$, $R_3$, and $R_4$ comprise alkyl radicals such as methyl, ethyl, propyl, butyl, pentyl, hexyl, heptyl, octyl, nonyl, decyl, undecyl, octadecyl, etc., and isomers thereof; cycloalkyl radicals such as cyclopropyl, cyclobutyl, cyclopentyl, cyclohexyl, cycloheptyl, cyclooctyl, cyclononyl, etc.; alkylcycloalkyl, radicals such as methylcyclobutyl, ethylcyclopently, tert-butyl-methylcyclohexyl, isopropylcyclohexyl, etc.; cycloalkyl-alkyl radicals such as cyclopropylmethyl, cyclopentylmethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is diphenylcyclohexyl peroxide,

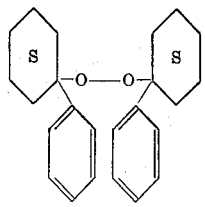

Mixtures of these peroxides may also be used. The peroxides are not limited to monoperoxides. Diperoxides such as the following are satisfactory,

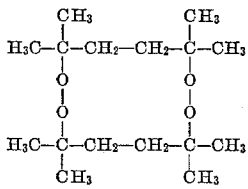

These peroxides may contain inorganic groups such as halogens, nitro groups, etc., for example, chlorophenyl, bromophenyl, nitrophenyl, etc.

The peroxides disclosed herein can be prepared by any of the methods known to the art. For example, di-α-cumyl peroxide,

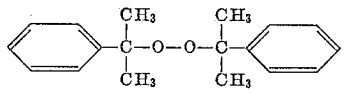

can be prepared by the method described by Kharasch et al. in the "Journal of Organic Chemistry" 15, pp. 756–762 (1950). While di-α-cumyl peroxide is a preferred peroxide, it may be advantageously used with mixtures of other peroxides, particularly where high density linear polyethylene is cross-linked.

The polyethylene referred to herein is a polymeric material formed by the polymerization of ethylene. It is described in Patent No. 2,153,553, Fawcett et al., and in "Modern Plastics Encyclopedia" New York, 1949, pp. 268–271. Specific examples of commercially available polyethylene are the polyethylenes examples of which are Alathons 1, 3, 10, 12, 14, etc., those such as DE-2400, DFD-2005, etc., and the polymers such as "Marlex 20, 50, etc. Other polyethylenes of various molecular weights are described by Lawton et al. in "Industrial and Engineering Chemistry" 46, pp. 1703–1709 (1954). While polyethylene is the component which is cross-linked in this process, it is understood that the invention includes blends of polyethylene with other polymers as well as copolymers of ethylene and other polymerizable materials. In a sense, the polymerizable materials copolymerized with ethylene and the polymers blended with polyethylene serve as modifying filler materials. Thus, this invention is not limited to calcium carbonate as the sole filler material, and it is frequently desirable in electrical applications to mix calcium carbonate with other fillers such as carbon black, calcium silicate, alumina, silica, and various clays prior to admixture with the polyethylene component.

The following examples are given by way of illustration rather than limitation. All parts are by weight.

Example 1

DFD-2005 polyethylene (100 parts) and calcium carbonate (100 parts) pretreated with a carboxylic acid such as stearic acid were mixed on a rubber mill at 120° C. until a homogeneous sheet was obtained. Di-α-cumyl peroxide (3 parts) was then milled into the sheet. This product was pressed into a 50-mil sheet by heating in a press for thirty minutes at 150° C. under 500 p.s.i. pressure. At 150° C., the resulting product has a tensile strength of 149 p.s.i. and an elongation of 143%. At room temperature, this product has a tensile strength of 2170 p.s.i. and an elongation of 467%. At room temperature, the product of the above Example had a percent power factor of 3.35, a specific inductive capacitance of 3.31, and a volume resistivity of 421; at 70° C., the percent power factor was 5.42, the specific inductive capacitance 3.42, and the volume resistivity 39.9.

An interesting phenomenon was observed in the examination of the above wire, for when the wire was held tautly in a horizontal position and flame applied the insulation, upon burning, intumesced rapidly and in a short time extinguished itself, leaving a portion of the insulation intact next to the conductor.

Example 2

DFD-2005 polyethylene (100 parts), calcium carbonate (125 parts) pretreated with stearic acid, and carbon black (25 parts) were mixed on a rubber mill at 120° C. until a homogenous sheet was obtained. Thereupon, di-α-cumyl peroxide (3 parts) was milled into the sheet and the product was press-cured for thirty minutes at 150° C. The cured product has a room-temperature tensile strength of 1777 p.s.i. and an elongation of 325%.

The treatment set forth in Example 1 was followed in the preparation of Examples 3–6 with the results indicated in Table I:

TABLE I

| Composition | Ex. 3 | Ex. 4 | Ex. 5 | Ex. 6 |
|---|---|---|---|---|
| Polyethylene | 100 | 100 | 100 | 100 |
| Carbon Black | 80 | 60 | 40 | 20 |
| Pretreated Calcium Carbonate | 20 | 40 | 60 | 80 |
| Di-α-cumyl Peroxide | 3 | 3 | 3 | 3 |
| Dielectric Strength, V./mil | 325 | 480 | 1,050 | 1,030 |
| Tensile Strength, p.s.i | 2,630 | 2,557 | 2,487 | 1,883 |

The information in Table I above illustrates the advantages accruing to the use of treated calcium carbonate filled cross-linked polyethylene as electrical insulation. As the ratio of calcium carbonate to carbon black proceeds from 1:4 to 4:1, a tolerable decline in tensile strength from 2630 p.s.i. to 1883 p.s.i. is offset by a highly desirable increase in dielectric strength from 325 volts per mil to over 1000 volts per mil.

Example 7

DFD-2005 polyethylene (100 parts), calcium carbonate (60 parts) pretreated with stearic acid, dibetanaphthyl-p-phenylenediamine (0.5 parts), and a coloring agent [a bis-azo coupling of dianisidine and phenyl methylpyrazolone] (0.5 parts) were mixed on a rubber mill at 120° C. until a homogeneous sheet was obtained. Thereupon di-α-cumyl peroxide (3 parts) was milled into the sheet and the product was press cured for thirty minutes at 150° C. The cured product had a room temperature tensile strength of 2260 p.s.i. and an elongation of 473%. This same compound was cured in open steam at 250 p.s.i.g. for one minute. The cured product had a tensile strength of 1780 p.s.i. and an elongation of 483%.

Example 8

DFD-2005 polyethylene (100 parts), calcium carbonate (100 parts) pretreated with stearic acid, and polymerized trimethyl dihydroquinoline (1 part) were introduced into a Werner-Pflederer intensive mixer at 130° C. and blended until a homogeneous mass was obtained. The temperature was reduced to 115° C. whereupon 3.2 parts of di-α-cumyl peroxide were added. The material was then sheeted on a two-roll mill, cooled, granulated, and introduced into the throat of an extrusion machine. The refluxed material was formed around #14 Awg solid wire in the conventional manner and cured immediately upon entering a steam chamber directly united with the extrusion head. The linear speed of this wire was 100 feet per minute and the steam pressure 250 p.s.i.g. The cured insulation upon removal from the conductor had a tensile strength of 1870 p.s.i. and an elongation of 493%.

Example 9

Grex 50–050C, an ethylene-butene copolymer with a density of 0.95 and a melt index of 5.0 (100 parts) and calcium carbonate (50 parts) pretreated with a carboxylic acid were mixed on a two-roll mill at 137° C. until a homogeneous sheet was obtained. 2,5-dimethyl-2,5-ditertiary butyl peroxy hexane (5 parts) was then milled into the sheet. This product was pressed into a 50-mil sheet by heating in a press for 30 minutes at 166° C. under 500 p.s.i. pressure. At room temperature the resulting product had a tensile strength of 1960 p.s.i. and an elongation of 100%.

*Example 10*

An ethylene propylene copolymer (100 parts) and calcium carbonate (50 parts) pretreated with stearic acid were mixed on a rubber mill until a homogeneous sheet was obtained. Di-α-cumyl peroxide (4 parts) was then milled into the sheet. This product was pressed into a 40-mil sheet and press cured for 20 minutes at 166° C. The resulting product had a tensile strength of 1030 p.s.i. and an elongation of 627%. A sample of unfilled, uncrosslinked copolymer had an elongation of >1000% and a tensile strength of 720 p.s.i.

All of the above compositions are satisfactory for extrusion as insulation on wire using standard equipment in the conventional manner. The very desirable electrical properties of thermoplastic polyethylene are largely preserved while its poor softening point and temperature rating are considerably improved. Wire insulated with the compositions of the above examples has given improved results as service drop cable and aerial spacer cable.

The surface-treated calcium carbonate fillers of this invention may be modified by agents such as dyes, pigments, stabilizers, etc., without departing from the scope of the invention. Although the weight percent of filler based on total weight of filler and polyethylene can be varied over wide limits, such as from about 1 to 75 percent, the preferable percent of filler is from 10–50 percent. The temperature and time of cure of the curable compositions of this invention are correlated to the particular cross-linking agent used, its concentration, and the other components present in the compositions as those skilled in the art well know. Accordingly, it is obvious that there are many variations from the foregoing which will still fall within the true spirit of the invention. Therefore, the invention is properly limited in scope only as the appended claims may be limited in scope.

Example 4 of the Gilbert and Precopio patent referred to in the introduction of this application serves as a standard for comparison of the properties of the above examples with an example in which a calcium carbonate is used which does not have a particle surface consisting of an integrally bonded reaction product of calcium carbonate and a carboxylic acid as taught in this application.

Example 4 of Patent 2,888,424 is as follows:

Alathon #7 polyethylene (60 parts) and calcium carbonate (20 parts) were mixed on a rubber mill at 120° C. until a homogeneous sheet was obtained. Thereupon di-α-cumyl peroxide (4 parts) was milled into the sheet. This product pressed into a 50–60 mil sheet by heating in a press for 30 minutes at 170° C. under 1000 p.s.i. had a tensile strength (125° C.) of 96 p.s.i. and an elongation (125° C.) of 200%.

I claim:

1. A curable composition comprising: (a) a polymeric member selected from the group consisting of polyethylene, ethylene-propylene copolymer, and ethylene-butene copolymer; (b) a peroxide in which each of the peroxide oxygen atoms is linked directly to a carbon atom; and (c) calcium carbonate filler in which the particle surface consists of an integrally bonded reaction product of calcium carbonate and stearic acid.

2. The composition of claim 1 which has been cured by heating to a temperature above the decomposition temperature of the peroxide.

3. Insulated wire and cable comprising a conductor and a coating of insulation on said conductor consisting of a composition as claimed in claim 2.

4. A curable composition according to claim 1 wherein said peroxide is di-α-cumyl peroxide and wherein the calcium carbonate filler is present within the range of 10 to 50 percent by weight of the total weight of calcium carbonate filler and polymer.

5. A curable composition according to claim 1 wherein said polymeric member is polyethylene, and wherein said peroxide is di-α-cumyl peroxide present within the range of 1 to 10 percent by weight of the polyethylene.

6. A curable composition comprising: (a) polyethylene; (b) a peroxide curing agent in which each of the peroxide oxygen atoms is linked directly to a carbon atom and which is present within the range of 1 to 10 percent by weight of said polyethylene, and (c) calcium carbonate filler in which the particle surface consists of an integrally bonded reaction product of calcium carbonate and stearic acid, the calcium carbonate filler being present within the range of 10 to 50 percent by weight of the total weight of the calcium carbonate filler and polyethylene.

7. The composition of claim 6 which has been cured by heating to a temperature above the decomposition temperature of said peroxide.

8. Insulated wire and cable comprising a conductor and a coating of insulation on said conductor consisting of a composition as claimed in claim 7.

References Cited

UNITED STATES PATENTS

| | | | |
|---|---|---|---|
| 2,628,214 | 2/1953 | Pinkney et al. | 260—23 |
| 2,888,424 | 5/1959 | Precopio et al. | 260—41 |
| 3,039,989 | 6/1962 | Eastman | 260—41 |
| 3,160,598 | 12/1964 | Delfosse | 260—23 |

OTHER REFERENCES

Wilson, "British Compounding Ingredients for Rubber," 1958, p. 147.

DONALD E. CZAJA, *Primary Examiner.*

LEON J. BERCOVITZ, *Examiner.*

R. A. WHITE, *Assistant Examiner.*